US011717937B2

United States Patent
Manabe et al.

(10) Patent No.: US 11,717,937 B2
(45) Date of Patent: Aug. 8, 2023

(54) AUTOMATIC POLISHING SYSTEM

(71) Applicant: Taikisha Ltd., Tokyo (JP)

(72) Inventors: Keiji Manabe, Tokyo (JP); Hiroyuki Suzuki, Tokyo (JP); Hideo Shiwa, Tokyo (JP); Genji Nakayama, Tokyo (JP)

(73) Assignee: Taikisha Ltd., Tokyo (JP)

( * ) Notice: Subject to any disclaimer, the term of this patent is extended or adjusted under 35 U.S.C. 154(b) by 906 days.

(21) Appl. No.: 16/486,875

(22) PCT Filed: Apr. 26, 2018

(86) PCT No.: PCT/JP2018/017030
§ 371 (c)(1),
(2) Date: Aug. 19, 2019

(87) PCT Pub. No.: WO2018/235430
PCT Pub. Date: Dec. 27, 2018

(65) Prior Publication Data
US 2020/0009705 A1   Jan. 9, 2020

(30) Foreign Application Priority Data
Jun. 21, 2017   (JP) .............................. JP2017-121582

(51) Int. Cl.
*B24B 49/12*   (2006.01)
*B25J 5/02*   (2006.01)
(Continued)

(52) U.S. Cl.
CPC ................. *B24B 49/12* (2013.01); *B25J 5/02* (2013.01); *B25J 9/0084* (2013.01); *B25J 11/0065* (2013.01); *B25J 13/08* (2013.01)

(58) Field of Classification Search
CPC ....... B24B 49/12; B25J 11/0065; B25J 13/08; B25J 5/02; B25J 9/0084
See application file for complete search history.

(56) References Cited

U.S. PATENT DOCUMENTS

| 4,886,529 A | * | 12/1989 | Hashimoto | .............. B25J 18/00 |
|   |   |   |   | 451/166 |
| 5,477,268 A | * | 12/1995 | Shimbara | ........... G05B 19/4182 |
|   |   |   |   | 348/125 |

(Continued)

FOREIGN PATENT DOCUMENTS

| CN | 103372797 A | * | 10/2013 | ......... B24B 27/0038 |
| CN | 103770112 A |   | 5/2014 |   |

(Continued)

*Primary Examiner* — Daniel L Greene
*Assistant Examiner* — Daniel L Greene, Jr.
(74) *Attorney, Agent, or Firm* — The Webb Law Firm

(57) ABSTRACT

A three-dimensional shape measuring instrument is provided for measuring a three-dimensional shape of the polishing subject face. A polishing controller is provided for controlling a polishing robot alone or with a polishing tool, based on three-dimensional shape data of the polishing subject face obtained by the shape measurement by the three-dimensional shape measuring instrument. The polishing tool provides a polishing action on the respective part of the polishing subject face through controlling of the polishing robot alone or with the polishing tool by the polishing controller. By controlling a measuring robot and the three-dimensional shape measuring instrument by the polishing controller, the three-dimensional shape measuring instrument moves to a predetermined measuring position relative to the polishing subject face to measure the three-dimensional shape of the polishing subject face.

9 Claims, 3 Drawing Sheets

(51) Int. Cl.
    *B25J 11/00*     (2006.01)
    *B25J 13/08*     (2006.01)
    *B25J 9/00*     (2006.01)

(56) References Cited

U.S. PATENT DOCUMENTS

| | | | |
|---|---|---|---|
| 2002/0072297 A1* | 6/2002 | Kennerknecht | B24B 27/0038 451/5 |
| 2013/0178134 A1* | 7/2013 | Eriksen | B24B 19/26 451/6 |
| 2014/0114459 A1* | 4/2014 | Nakahara | G05B 19/042 700/112 |
| 2015/0099425 A1* | 4/2015 | Trnka | B25J 9/0084 451/6 |
| 2015/0360338 A1 | 12/2015 | Rizzo, Jr. et al. | |
| 2016/0354933 A1* | 12/2016 | Sato | B25J 9/1633 |
| 2018/0326591 A1* | 11/2018 | Häusler | G06V 10/98 |

FOREIGN PATENT DOCUMENTS

| | | | |
|---|---|---|---|
| EP | 2722138 A2 | | 4/2014 |
| EP | 2859995 A1 | | 4/2015 |
| JP | H05038662 A | | 2/1993 |
| JP | 05092345 A | * | 4/1993 |
| JP | H05138531 A | | 6/1993 |
| JP | H06278007 A | | 10/1994 |
| JP | H06285762 A | | 10/1994 |
| JP | H07246552 A | | 9/1995 |
| JP | 2008151710 A | | 7/2008 |
| WO | 2010091086 A1 | | 8/2010 |

* cited by examiner

AUTOMATIC POLISHING SYSTEM

CROSS-REFERENCE TO RELATED APPLICATIONS

This application is the United States national phase of International Application No. PCT/JP2018/017030 filed Apr. 26, 2018, and claims priority to Japanese Patent Application No. 2017-121582 filed Jun. 21, 2017, the disclosures of which are hereby incorporated by reference in their entirety.

TECHNICAL FIELD

This invention relates to an automatic polishing system.

More particularly, with this automatic polishing system, a polishing tool held by a polishing robot is moved to each part of a polishing subject face of a treatment subject by motions of the polishing robot and in association with this movement, the polishing tool provides a polishing treatment to the polishing subject face.

BACKGROUND ART

In the case of the conventional robot control technique commonly employed, when a polishing treatment is to be effected on a polishing subject face of a treatment subject with using a polishing robot holding the polishing tool;

firstly, as a teaching process for the polishing robot, robot motions for causing the polishing tool to move along a predetermined movement path to respective part of the polishing subject face of the treatment subject are taught to a controller in advance.

With the above, as the control robot implements the taught robot motions, the polishing tool will move to the respective part of the polishing subject face along the predetermined movement path and in association with this movement, the polishing tool will provide a polishing action on the respect part of the polishing subject face.

PRIOR ART DOCUMENT

Patent Document

No reasonably related prior-art document has been located.

SUMMARY OF INVENTION

Problem to be Solved by Invention

However, the teaching process for the polishing robot requires much manpower and trouble, so with the above-described mode of process, there arises a problem of significant burden being imposed on a worker even when the polishing is automated.

Further, as the teaching process requires significant time, there will arise another problem of the process efficiency of the polishing treatment as a whole including the teaching process being limited low.

Moreover, in the teaching process for the polishing robot, it is difficult to provide detailed response/measure to possible variations of positions, extending shapes, areas, heights, etc. of respective protruding parts which may be present in the polishing subject face.

For this reason, the mode of treatment possible may be the polishing tool giving only same fixed polishing action on the respective parts of the polishing subject face, disadvantageously.

And, the above situation will invite another problem of the finish quality of the polishing treatment being limited low.

In view of the above-described state of the art, the principal object of the present invention is to provide an automatic polishing system that can effectively resolve these problems.

SOLUTION

A first characterizing feature of the present invention relates to an automatic polishing system. According to this feature, there is provided an automatic polishing system in which a polishing tool held by a polishing robot moves to a respective part of a polishing subject face of a treatment subject by motions of the polishing robot and in association with the movement, the polishing tool effects a polishing treatment on the polishing subject face, the system comprising:

a three-dimensional shape measuring instrument for measuring a three-dimensional shape of the polishing subject face;

a polishing controller for controlling the polishing robot or controlling the polishing robot and the polishing tool, based on three-dimensional shape data of the polishing subject face obtained by the shape measurement by the three-dimensional shape measuring instrument; and the polishing tool providing a polishing action on the respective part of the polishing subject face through controlling of the polishing robot or both the polishing robot and the polishing tool by the polishing controller.

With the above-described arrangement, based on three-dimensional shape data of the polishing subject face obtained through the shape measurement by the three-dimensional shape measuring instrument (in other words, data indicative of unevenness state of the respective part in the polishing subject face), the polishing robot or both this polishing robot and the polishing tool will be controlled. And, by this control, the polishing tool will provide a polishing action on the respective part of the polishing subject face. Thus, there is no need for the teaching process for teaching robot motions of the polishing robot to a controller in advance.

Therefore, the burden on the worker can be significantly reduced.

Further, by a degree made possible due to no need for the teaching process for the polishing robot, the treatment efficiency can be improved.

Moreover, with respect also to the possible variations of the positions, extending shapes, areas, heights, etc. of respective protruding parts which may be present in the polishing subject face, detailed response/measure can be taken to cope with them, since the polishing tool provides the polishing action on the respective part of the polishing subject face under the control based on the above-described three-dimensional shape data.

With the above, the finish quality of the polishing treatment will be effectively improved also.

A second characterizing feature of the present invention specifies a preferred mode in embodying the arrangement according to the first feature. According to this second characterizing feature:

a measuring robot is provided for holding the three-dimensional shape measuring instrument;

the polishing controller controls the measuring robot and the three-dimensional shape measuring instrument;

by the control of the measuring robot by the polishing controller, the three-dimensional shape measuring instrument moves to a predetermined measuring position relative to the polishing subject face; and by the control of the three-dimensional shape measuring instrument by the polishing controller, the three-dimensional shape measuring instrument measures a three-dimensional shape of the polishing subject face.

With the above-described arrangement, the three-dimensional shape measurement of the polishing subject face by the three-dimensional shape measuring instrument is automated. Thus, in comparison with the case of the three-dimensional shape measuring instrument being operated by the worker, the burden on the worker can be even further reduced.

And, by the degree made possible due to the above, the treatment efficiency of the polishing treatment can be even further improved.

A third characterizing feature of the present invention specifies a preferred mode in embodying the arrangement according to the first or second feature. According to this third characterizing feature:

when the polishing controller controls the polishing robot based on the three-dimensional shape data, the polishing tool is moved only to a position of a polishing needing part of the polishing subject face, without being moved to a position of a polishing no-needing part of the polishing subject face.

With the above-described arrangement, the polishing tool will not be moved to a position of a polishing no-needing part of the polishing subject face, but moved only to a position of a polishing needing part of the same. Therefore, even when the polishing subject face is to be polished by a certain equal degree, the length of the movement path of the polishing tool is reduced.

Therefore, by the degree made possible due to the above, the treatment efficiency of the polishing treatment can be even further improved.

A fourth characterizing feature of the present invention specifies a preferred mode in embodying the arrangement according to any one of the first through third features. According to this fourth feature:

the polishing controller adjusts a polishing output of the polishing tool or the number of times of polishing actions by the polishing tool, for each polishing-needing part of the polishing subject face, based on the three-dimensional shape data.

With the above-described arrangement, in accordance with the height of each protruding part present in the polishing subject face, the polishing output of the polishing tool or the number of times of polishing actions by this polishing tool can be adjusted, so that each protruding part can be treated to a uniform smoothed state.

Therefore, the finish quality of the polishing treatment can be improved effectively.

A fifth characterizing feature of the present invention specifies a preferred mode in embodying the arrangement according to any one of the first through fourth features. According to this fifth feature:

the polishing controller adjusts a movement speed of the polishing tool by adjusting a motion speed of the polishing robot, for each polishing-needing part of the polishing subject face, based on the three-dimensional shape data.

With the above-described arrangement, in accordance with the height of each protruding part present in the polishing subject face, the motion speed of the polishing robot is adjusted, so that each protruding part can be treated to a uniform smoothed state.

Therefore, the finish quality of the polishing treatment can be improved effectively.

A sixth characterizing feature of the present invention specifies a preferred mode in embodying the arrangement according to any one of the first through fifth features. According to this sixth feature:

the polishing controller creates, based on the three-dimensional shape data, an image that shows an unevenness condition of the polishing subject face through contour lines or variation in color density and displays the created image on a screen of a display.

With the above-described arrangement, with reference to the image displayed on the screen of the display, a work manager can easily and accurately grasp the unevenness condition of the polishing subject face.

Therefore, the work manager can mange the polishing treatment on the polishing subject face more easily and more accurately.

A seventh characterizing feature of the present invention specifies a preferred mode in embodying the arrangement according to any one of the first through sixth features. According to this seventh feature:

the polishing controller causes the polishing tool to move by motions of the polishing robot to carry out a polishing treatment on the polishing subject face and then causes the three-dimensional shape measuring instrument to re-measure the three-dimensional shape of the polishing subject face after the polishing treatment.

With the above-described arrangement, it becomes possible to store/retain the three-dimensional shape of the polishing subject face obtained by the re-measurement as data verifying appropriate implementation of the polishing treatment or to utilize this shape as data for determining need or no-need of re-polishing treatment.

MODES OF EMBODYING THE INVENTION

Figure 1:
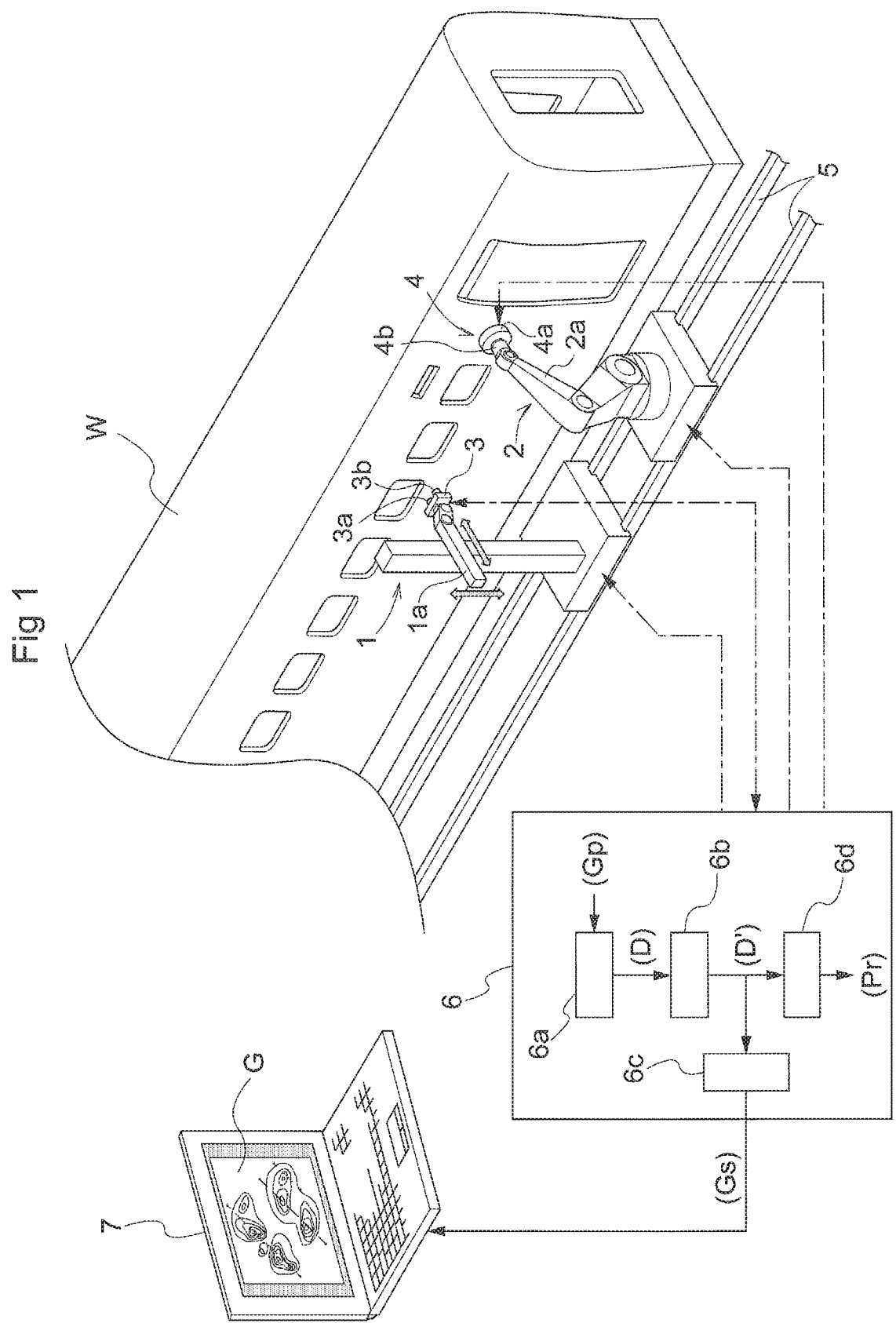
FIG. 1 is a schematic view showing a system configuration of an automatic polishing system.

FIG. 1 shows an automatic polishing system for a railway car.

This automatic polishing system is configured to carry out a polishing treatment on a painted film surface of putty paint applied on an outer face of the railway car W, as a first coat treatment of a finish painting.

With this polishing treatment when effected, the surface of the putty painting will be rendered into a smooth surface suitable for the finish painting.

Adjacent the putty painted car W, a measuring robot 1 and a polishing robot 2 are disposed side by side along a longitudinal direction of the car W.

An arm 1a of the measuring robot 1 holds a three-dimensional shape measuring instrument 3 of pattern projection type (this will be referred to simply as "shape measuring instrument 3" hereinafter).

An arm 2a of the polishing robot 2 holds a driven rotor type polishing device 4 as a "polishing tool".

A polishing rotor 4a of the driven rotor type polishing device 4 is rotated by a motor 4b.

Both the measuring robot 1 and the polishing robot 2 can move/travel on common rails 5 installed along the car W.

Figure 2:
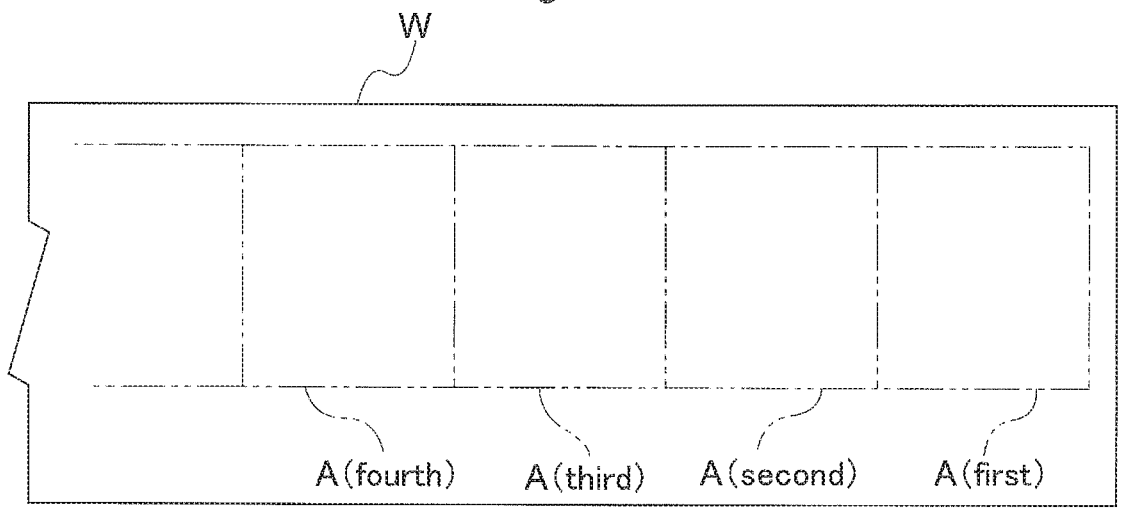
FIG. 2 is an explanatory view illustrating a mode of dividing a polishing subject face.

For a polishing treatment, the outer face of the car W as a "treatment subject" will be divided in advance into a plurality of polishing subject faces A as illustrated in FIG. 2, for instance.

In response to traveling movement and arm motion of the measuring robot 1, the shape measuring instrument 3 is caused to move to a predetermined measuring position suitable for shape measurement relative to a first polishing subject face A and after this movement, a three-dimensional shape of this first polishing subject face A will be measured by the shape measuring instrument 3.

Upon completion of this above measurement, in succession thereto, in response to a further traveling movement and arm motion of the measuring robot 1, the shape measuring instrument 3 is caused to move to a predetermined measuring position suitable for shape measurement on a subsequent (i.e. second) polishing subject face A.

On the other hand, in response to a traveling movement and arm motion of the polishing robot 2, the polishing device 4 is caused to move to a position suitable for carrying out a polishing treatment on the measured first polishing subject face A.

And, the polishing device 4 moves to a respective part of the first polishing subject face A by an arm motion of the polishing robot 2 (if necessary, an arm motion accompanied by a traveling movement of the polishing robot 2) and in association with this movement, the polishing device 4 provides a polishing action on the respect part of the first polishing subject face A.

The arm motion of the polishing robot 2 and the traveling movement of the polishing robot 2 in the course of the above are carried out based on the three-dimensional shape data D of the first polishing subject face A obtained from the foregoing shape measurement by the shape measuring instrument 3 on the first polishing subject face A.

Further, in the course of polishing treatment on this first polishing subject face A, the three-dimensional shape of a second polishing subject face A is measured by the shape measuring instrument 3.

Thereafter, similarly to the above, with traveling movements and arm motions of the measuring robot 1 and the polishing robot 2, the shape measuring instrument 3 and the polishing device 4 will respectively be moved one after another to positions suitable for shape measurement and polishing treatment of each polishing subject face A, so that the shape measuring instrument 3 will measure a three-dimensional shape of each polishing subject face A and in succession to this measurement, based on the three-dimensional shape data D of the respective polishing subject face A obtained through the shape measurement by the shape measuring instrument 3, the polishing device 4 will move to the respective part of the respective polishing object face A and provide a polishing action on the respective part of the respective polishing subject face A.

Figure 3:
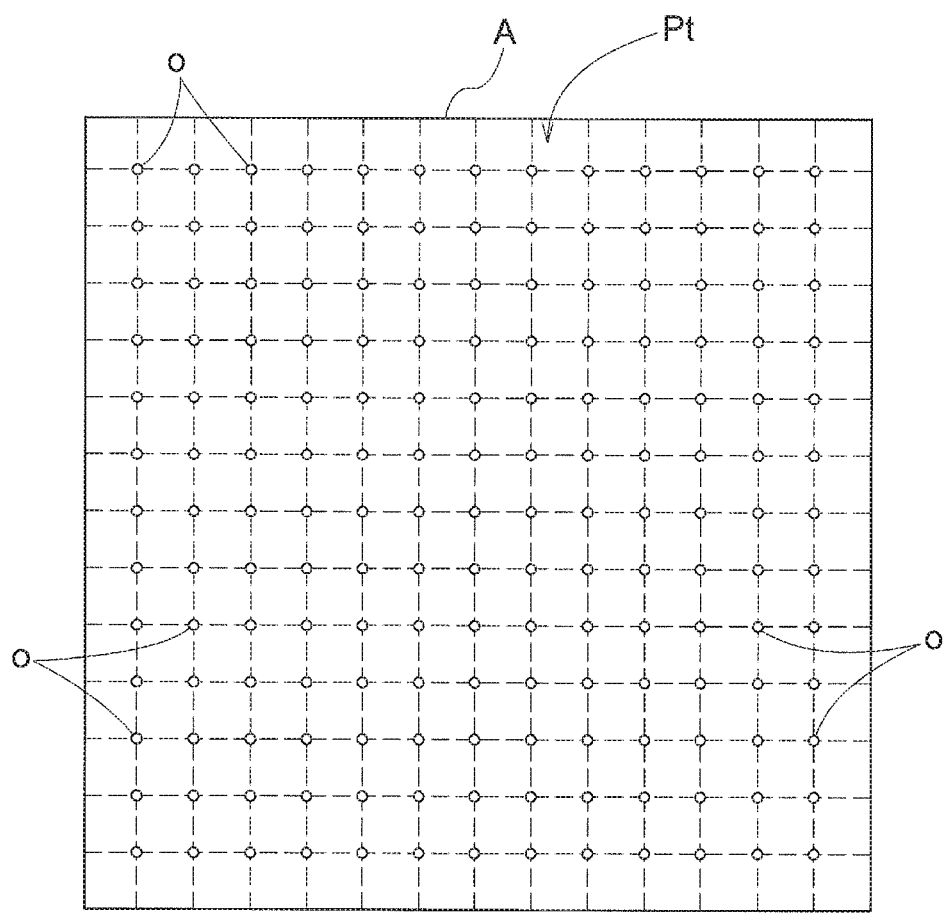
FIG. 3 is an explanatory view schematically showing a projection pattern.

In the shape measurement by the pattern projection type three-dimensional shape measuring instrument 3, a projector 3a mounted on this shape measuring instrument 3 projects, onto the polishing subject face A, a dot group pattern Pt as shown in FIG. 3 comprised of many dot images (○) arranged in a grid pattern.

And, the polishing subject face A with this dot group pattern Pt being projected thereon will be image-captured by a camera 3b mounted on the shape measuring instrument 3.

A photographed data Gp obtained by the above-described photography is sent to an analysis section 6a of the polishing controller 6.

Here, the polishing controller 6 is provided not only for controlling the measuring robot 1 and the polishing robot 2, but also for controlling the shape measuring instrument 3 and the polishing device 4.

In the analysis section 6a of the polishing controller 6, based on the photographed data Gp sent from the shape measuring instrument 3, analysis is made on positional relationships among the dot images (○) in the dot group pattern Pt projected onto the polishing subject face A (namely, the positional relationships among the dot images (○) which have been displaced due to influence from the unevenness in the polishing subject face A).

By this analysis, three-dimension coordinates ($\alpha$, $\beta$, $\gamma$) of each dot (q) on the polishing subject face A, as the three-dimensional shape data D of the polishing subject face A, will be calculated by the analysis section 6a.

Figure 4:
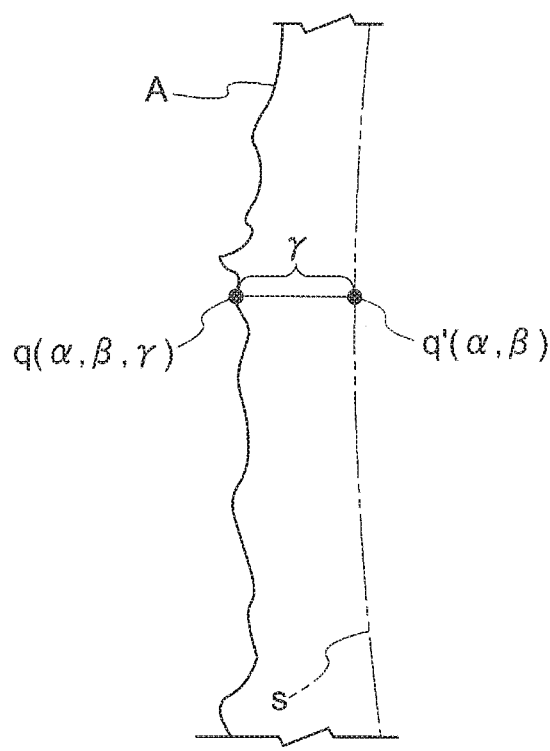
FIG. 4 is an explanatory view schematically showing a section of a paint film.

Meanwhile, as shown in FIG. 4, the three-dimension coordinates ($\alpha$, $\beta$, $\gamma$) of each dot (q) on the polishing subject face A calculated by the analysis section 6a consist of position coordinates ($\alpha$, $\beta$) of the corresponding point q' on a preset reference plane (s) and a height coordinate ($\gamma$) of each dot (q) in the direction perpendicular to the reference plane (s).

Further, the three-dimensional shape data D comprised of the three-dimension coordinates ($\alpha$, $\beta$, $\gamma$) of each dot (q) calculated by the analysis section 6a is sent to a conversion section 6b of the polishing controller 6.

In this conversion section 6b, the three-dimension coordinates ($\alpha$, $\beta$, $\gamma$) of each dot (q) calculated by the analysis section 6a will be converted into three-dimension coordinates (x, y, z) relative to a three-dimensional coordinate system used in the motion control of the polishing robot 2 as a reference.

With this conversion, in the conversion section 6b, converted three-dimensional shape data D' for polishing treatment (i.e. data which represents measured three-dimensional shape of the polishing subject face A with using the coordinate system of the polishing robot) is created.

And, this converted three-dimensional shape data D' is sent to a visualization section 6c in the polishing controller 6 and sent also to a program production section 6d in the polishing controller 6.

Figure 5:
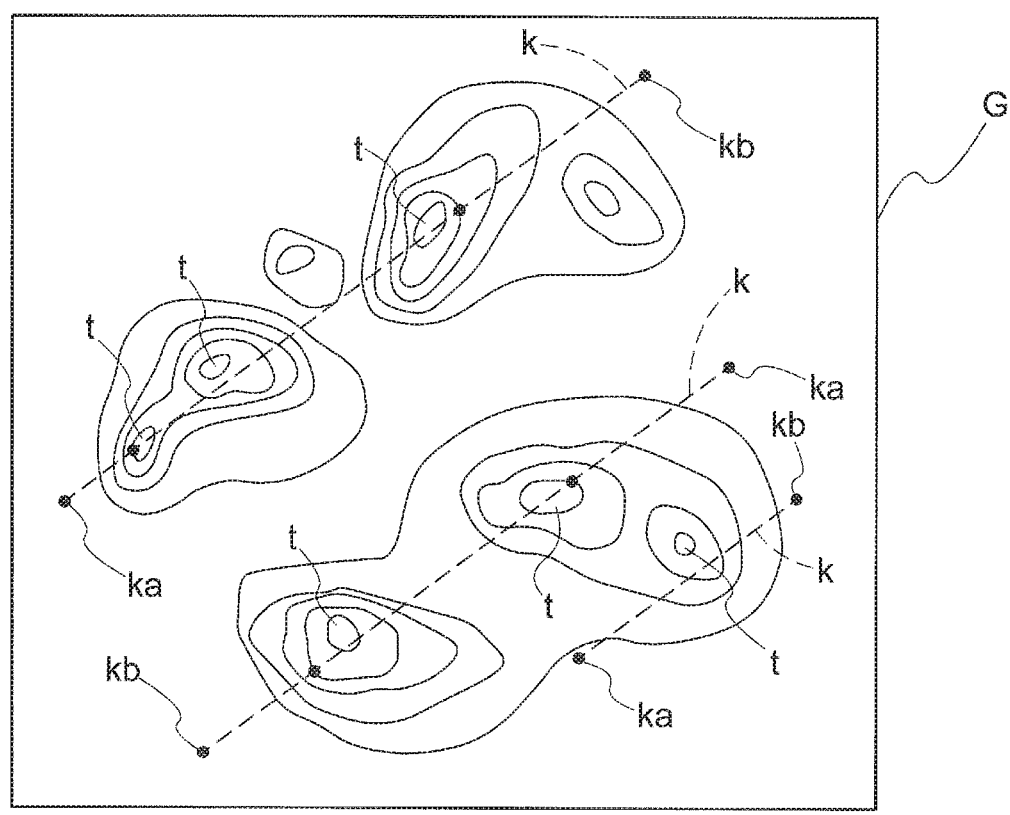
FIG. 5 is an explanatory view of an image showing unevenness condition.

In the visualization section 6c of the polishing controller 6, based on the converted three-dimensional shape data D' of the polishing subject face A sent from the conversion section 6b, image data Gs of topographic image G as shown in FIG. 5 is produced.

This topographic image G is an image which shows the unevenness condition of the polishing subject A in the form of contour lines or variation in the color density.

And, this image data Gs is sent from the visualization section 6c of the polishing controller 6 to a display 7 for management.

In the management display 7, the image data Gs sent from the visualization section 6c of the polishing controller 6 is visualized, whereby the topographic image G will be displayed on the screen of the display 7.

On the other hand, in the program production section 6d of the polishing controller 6, based on the converted three-dimensional shape data D' [=each point p (x, y, z)] of the polishing subject face A sent from the conversion section 6b, for each one of a plurality of polishing subject uneven parts (t) (see FIG. 5) which are aligned along a predetermined direction and in close vicinity with each other, vertical line segments (k) interconnecting the plurality of polishing subject protruding parts (t) disposed side by side in close vicinity will be set.

Here, the polishing subject protruding part (t) refers to a portion or a part in the protruding part present in the polishing subject face A whose height is greater than a threshold value.

Incidentally, as for an "independent" polishing subject protruding part (t) having no other neighboring polishing subject protruding part (t) in the vicinity thereof, a virtual line segment (k) in the predetermined section will be set which passes only such independent polishing subject part (t).

Further, in the program production section 6d, one terminal end of one virtual line segment (t) is set as a polishing start point (ka) and the other terminal end thereof is set as a polishing end point (kb). In this way, a polishing start point (ka) and a polishing end point (kb) will be set at respective terminal ends of each virtual line segment (k).

Moreover, in succession to these setting operations, in the program production section 6d, there is produced a motion program Pr having following contents a-c, as motion programs for the polishing robot 2 and the polishing device 4.

a. For each virtual line segment (k), the polishing rotor 4a of the polishing device 4 is rotated under a state thereof being pressed against the polishing subject face A, while the polishing device 4 is moved along the virtual line segment (k) from the polishing start point (ka) to the polishing end point (kb).

b. When the polishing device 4 passes through each polishing subject protruding part (t), the greater the height of the respective polishing subject protruding part (t), the higher the rotational speed of the polishing rotor 4a will be made (i.e. the polishing output of the polishing device 4 will be increased).

c. After the polishing device 4 has arrived at the polishing end point (kb), the polishing device 4 will be moved via a shortcut to the polishing start point (ka) of the adjacent virtual line segment (k), with keeping the polishing rotor 4a floating off the polishing subject face A.

And, in response to this production of the motion program Pr, the polishing controller 6 moves the polishing device 4 to a position suitable for carrying out a polishing treatment on the polishing subject face A after the measurement by the shape measuring instrument 3, via traveling movement and arm motion of the polishing robot 2, and then controls the polishing robot 2 and the polishing device 4 respectively in accordance with this motion program Pr.

Namely, as the polishing controller 6 controls the polishing robot 2 and the polishing device 4 according to this motion program Pr, the polishing device 4 will move along the respective virtual line segments (k) one after another on the polishing subject face A by the motions of the polishing robot 2 and simultaneously the polishing device 4 will provide polishing actions to the respective polishing subject protruding parts (t) one after another.

With the above, the respective protruding part (t) as the "polishing needing parts" in the polishing target face A will be rendered into uniform smoothed states, thus the surface of the putty paining as the polishing subject face A will be smoothed into states suitable as the base of the finish painting.

Incidentally, with this automatic polishing system, both traveling movements of the measuring robot 1 and the polishing robot 2 and moving of the shape measuring instrument 3 and the polishing device 4 to positions suitable for shape measurement and polishing treatment on the respective polishing subject face A are implemented automatically by controlling the respective robots 1, 2 according to a predetermined program via the polishing controller 6.

Moreover, the measurement of the three-dimensional shape of the respective polishing subject face A by the shape measuring instrument 3 is also automatically implemented by controlling the shape measuring instrument 3 according to the predetermined program via the polishing controller 6.

Further, each virtual line segment (k) set on the polishing subject face A is shown on the topographic image G displayed by the display 7.

Also, when the polishing device 4 is carrying out a polishing treatment on the polishing subject face A, the current position and the movement path of the polishing device A on the polishing subject face A will be shown also on the topographic image G displayed by the display 7.

Further Embodiments

Next, further embodiments of the present invention will be recited respectively.

In the foregoing embodiment, there was shown an example in which the polishing robot 2 holds the driven rotor type polishing device 4 as the "polishing tool".

However, the polishing tool to be held by the polishing robot 2 can be any other type of polishing tool such as a driven type polishing tool whose polishing part is driven by a drive device or a stationary type polishing tool whose polishing part is moved only by a motion of the polishing robot 2.

In the foregoing embodiment, there was shown an example in which the measuring robot 1 holds the pattern projection type three-dimensional shape measuring instrument 3 as a "three-dimensional shape measuring instrument".

However, the three-dimensional shape measuring instrument to be held by the measuring robot 1 can be any other type of three-dimensional shape measuring instrument, such as a light cutting type three-dimensional shape measuring instrument.

Furthermore, in place of the arrangement of providing the measuring robot 1 configured to hold the three-dimensional shape measuring instrument 3, it may be arranged such that the three-dimensional shape measuring instrument 3 may be held and operated by a worker.

In the foregoing embodiment, it was arranged such that at the time of passage of the polishing device 4 at the respective polishing subject protruding part (t), the greater the height of the respective polishing subject protruding part (t), the higher the rotational speed of the polishing rotor 4a is set, thus increasing the polishing output of the polishing device 4.

However, the method of adjusting the polishing output of the driven type polishing tool held by the polishing robot 2 for respective polishing needing part is not limited to such adjustment of rotational speed, but may be any other method of adjustment chosen appropriately in accordance with the driving method employed by the driven type polishing tool, such as adjustment of oscillation speed of the polishing tool.

Further, in the mode of arrangement in which polishing actions are provided in repetition via reciprocal movements of the driven type or stationary type polishing tool across the polishing subject part in the polishing subject face A via motions of the polishing robot 2, it is possible to adjust the number of times of polishing actions provided by the polishing tool or to adjust the movement speed of the polishing tool, via motions of the polishing robot 2, or to adjust the pressed contact force provided from the polishing tool to the polishing needing art, via motions of the polishing robot 2, for each polishing needing part.

Moreover, for each polishing needing part in the polishing subject face A, the above-described adjustment of the polishing output, the adjustment of the times of polishing actions and the adjustment of the polishing tool movement speed, may be implemented in an appropriate combination.

For instance, in case still higher polishing ability is required when the polishing output is set already to its adjustment upper limit value, the movement speed of the polishing tool may be adjusted with the polishing output being fixed to such adjustment upper limit value, thus making it possible to obtain the required polishing ability.

In the foregoing embodiment, through motions of the polishing robot 2, the polishing tool 4 is moved along the respective virtual line segments (k) set on the polishing subject face A, one after another.

However, the arrangement is not limited to the above. The movement path of the polishing tool relative to the polishing subject face A can be any movement path. For instance, it may be arranged such that the polishing tool be moved along a virtual meandering line which interconnects a plurality of polishing needing parts adjacent each other.

Moreover, in the foregoing embodiment, after the polishing device 4 has arrived at the polishing end point (kb), the polishing device 4 will be moved via a shortcut to the polishing start point (ka) of the adjacent virtual line segment (k), with keeping the polishing rotor 4a floating off the polishing subject face A.

However, the arrangement is not limited to the above. Alternatively, it is also possible to arrange such that the polishing tool be moved sequentially while providing polishing actions to all parts in the polishing subject face A, and at time of passage of the polishing tool at a particular polishing needing part present in the course of the above movement, the polishing output of the polishing tool may be increased or the number of times of the polishing actions provided by the polishing tool may be increased, or the movement speed of the polishing tool may be reduced, or the pressed contact force of the polishing tool may be increased.

Furthermore, after implementation of the polishing treatment of the polishing subject face A by movement of the polishing tool via motions of the polishing robot 2, a three-dimensional shape of the polishing subject face A after this polishing treatment may be measured again by the three-dimensional shape measuring instrument 3 and the resultant three-dimensional shape of the polishing subject face A obtained by the above re-measurement may be kept as data for verifying appropriate implementation of polishing treatment or may be used as data for use in judgment of need or no-need of re-polishing treatment, etc.

The treatment subject subjected to a polishing treatment by the inventive automatic polishing system is not limited to a railway car W applied with putty painting, but may also be an automobile body or building or construction work material or other various kinds of articles, with or without painting.

INDUSTRIAL APPLICABILITY

The automatic polishing system according to the present invention is applicable to polishing treatment of various kinds of treatment subjects in a variety of fields.

DESCRIPTION OF SINGS

4: polishing device (polishing tool)
2: polishing robot
W: railway car (treatment subject)
A: polishing subject face
3: three-dimensional shape measuring instrument
D: three-dimensional shape data
6: polishing controller
1: measuring robot
t: polishing subject protruding part (polishing needing part)
G: image
7: display

The invention claimed is:

1. An automatic polishing system comprising:
a polishing tool configured to polish a polishing subject face of a treatment subject;
a polishing robot configured to hold the polishing tool;
a three-dimensional shape measuring instrument for measuring a three-dimensional shape of the polishing subject face; and
a polishing controller for controlling the polishing robot to cause the polishing tool to polish the polishing subject face, based on three-dimensional shape data of the polishing subject face obtained by the three-dimensional shape measuring instrument;
wherein the polishing controller causes, when a plurality of protruding portions larger than a threshold value aligned along a predetermined direction is detected on the polishing subject face based upon the three-dimensional shape data, the polishing tool to move along a virtual line interconnecting the plurality of protruding portions.

2. The automatic polishing system of claim 1, wherein the polishing controller is configured to create, based on the three-dimensional shape data, an image that shows an unevenness condition of the polishing subject face through contour lines or variation in color density and displays the created image on a screen of a display.

3. The automatic polishing system of claim 1, wherein for an independent polishing subject protruding portion having no other polishing subject protruding portion aligned in close vicinity thereto in the predetermined direction, the polishing controller is configured to set the virtual line in the predetermined direction that passes only the independent polishing subject protruding portion.

4. The automatic polishing system of claim 1, further comprising a measuring robot for holding the three-dimensional shape measuring instrument;
wherein the polishing controller is configured to control:
(i) the measuring robot for moving the three-dimensional shape measuring instrument to a predetermined measuring portion relative to the polishing subject face; and
(ii) the three-dimensional shape measuring instrument for measuring a three-dimensional shape of the polishing subject face.

5. The automatic polishing system of claim 4, wherein:
the measuring robot and the polishing robot are configured to travel on common rails installed along the treatment subject;
the three-dimensional shape measuring instrument is configured to, in association with traveling of the measuring robot along the common rails, move to a position suitable for the shape measurement of the polishing subject face; and
the polishing tool is configured to, in association with traveling of the polishing robot along the common rails, move to a position suitable for the polishing treatment of the polishing subject face.

6. The automatic polishing system of claim 1, wherein:
the virtual line comprises a plurality of virtual line segments;
the polishing controller is configured to, in association with the setting of the virtual line segments, set a polishing start point and a polishing end point for terminal portions of the virtual line segments alternately in such a manner as to set one terminal portion of one virtual line segment as the polishing start point and the other terminal portion thereof as the polishing end point and to set one terminal portion of another adjacent virtual line segment as the polishing end point and the other terminal portion thereof as the polishing start point; and
the polishing controller is configured to control after setting the polishing start point and the polishing end point, for the respective virtual line segments, the polishing robot in such a manner as to move the polishing tool along the virtual line segment from the polishing start point to the polishing end point and also to move the polishing tool which has arrived at the polishing end point of one virtual line segment to the adjacent virtual line segment with keeping the polishing tool afloat the polishing subject face.

7. The automatic polishing system of claim 6, wherein:
the polishing controller is configured to calculate, as the three-dimensional shape data, three-dimensional coordinates of respective point on the polishing subject face based on the result of the measurement by the three-dimensional shape measuring instrument; and
the three-dimensional coordinates consist of position coordinates of a corresponding point corresponding to each point on a present reference plane and height coordinates for each point in the direction perpendicular to the reference plane.

8. The automatic polishing system of claim 1, wherein:
the polishing controller is configured to calculate, as the three-dimensional shape data, three-dimensional coordinates of respective point on the polishing subject face based on the result of the measurement by the three-dimensional shape measuring instrument; and
the three-dimensional coordinates consist of position coordinates of a corresponding point corresponding to each point on a present reference plane and height coordinates for each point in the direction perpendicular to the reference plane.

9. The automatic polishing system of claim 8, wherein the polishing controller is configured to adjust a polishing output of the polishing tool in accordance with the height coordinates of each polishing subject protruding portion which is passed by the polishing tool in the movement of this polishing tool along the virtual line.

* * * * *